Aug. 18, 1936. C. NELSON 2,051,100
SAFETY VALVE
Filed March 21, 1934
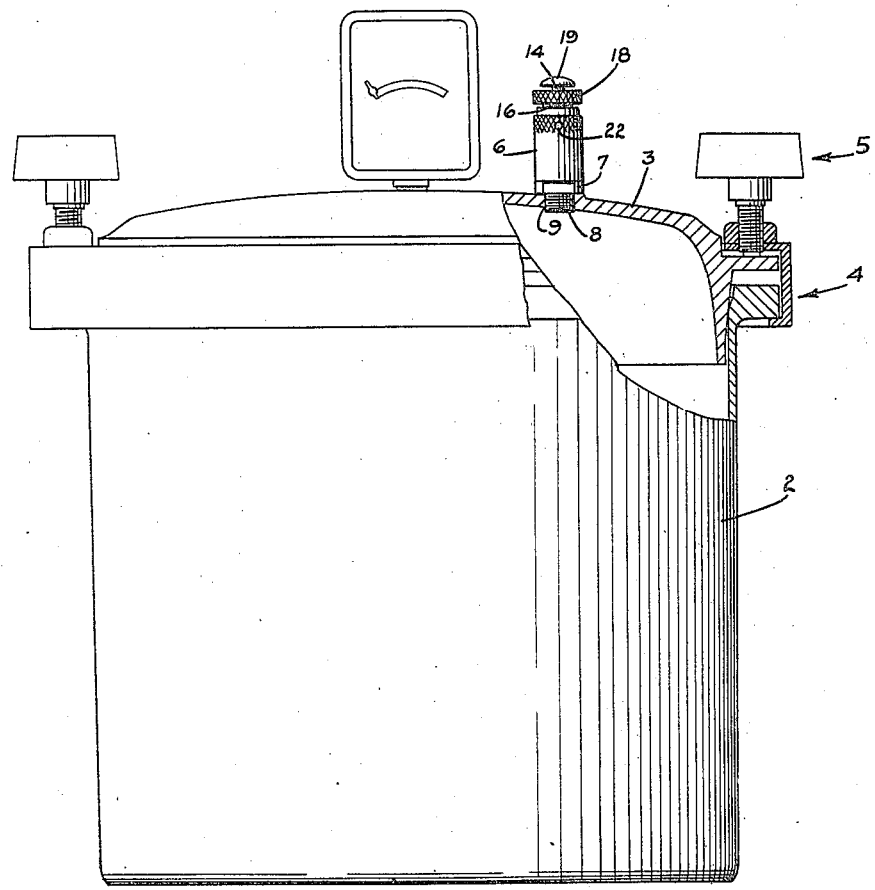
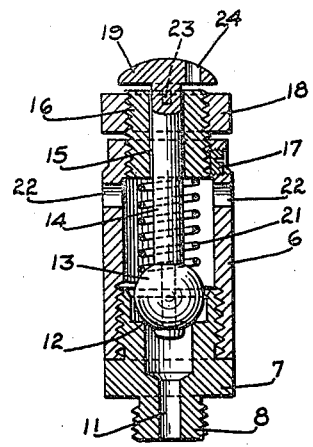
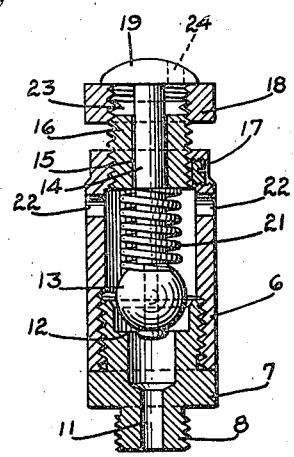
INVENTOR
CARL NELSON
BY *Paul, Paul & Moore*
ATTORNEYS Patented Aug. 18, 1936

2,051,100

UNITED STATES PATENT OFFICE 2,051,100

SAFETY VALVE

Carl Nelson, Eau Claire, Wis., assignor to National Pressure Cooker Company, Eau Claire, Wis., a corporation of Wisconsin Application March 21, 1934, Serial No. 716,611

2 Claims. (Cl. 137—53)

This invention relates to new and useful improvements in safety valves, generally, and more particularly to valves adapted for use in connection with such apparatus as pressure cookers.

An object of the invention is to provide a safety valve comprising a valve having a spring normally holding it in engagement with its seat against the pressure of the fluid in said chamber, and comprising means whereby the tension in said spring may be varied to cause the valve to unseat when a predetermined pressure is reached in said chamber.

Other objects reside in the novel construction of the safety valve whereby the unseating of the valve thereof may be controlled with a micrometer adjustment to thereby permit the steam or fluid pressure within the chamber to escape therefrom very slowly; and, in the provision of a combination safety or pop valve and a pressure release valve, which is small and compact, is positive in operation, and may readily be adjusted to control the escape of the steam from the chamber with which said valve is connected.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view of my improved valve showing it in normal closed position;

Figure 2 is a similar view showing the valve unseated; and

Figure 3 is a view showing the device as applied to an ordinary type of steam cooker.

In the selected embodiment of the invention here shown, there is illustrated in Figure 3, for purposes of disclosure, a pressure cooker comprising a body portion 2 having a cover 3 secured thereto by suitable securing means, generally indicated by the numerals 4 and 5, whereby the cover is secured to the body portion in hermetically sealed relation.

The novel safety valve herein disclosed, is shown comprising a body portion 6, preferably cylindrical in cross-section and threaded at its lower end to receive a base plug 7. The plug 7 has a reduced threaded extension 8 adapted to be received in a threaded socket 9 provided in a suitable support, such as the cover 3. A fluid circulating passage 11 is provided in the plug 7 and terminates at its upper end in a valve seat 12. The passage 11 establishes communication between the interior of the cooker body 2 and the interior of the valve casing 6, as will readily be understood by reference to Figures 1 and 2.

A suitable valve 13, preferably spherical in form, is secured to the lower end of a stem 14, the upper end of which is slidably received in a guide opening 15 provided in an exteriorly threaded sleeve 16. The sleeve 16 is received in threaded engagement with the upper end portion of the valve casing 6 and is secured in adjusted position therein by such means as a lock screw 17. The sleeve 16 extends beyond the upper end of the valve casing 6 and has mounted thereon, an annular adjusting nut or member 18, axially adjustable thereon.

An enlarged head 19 is secured to the upper end of the valve stem 14 and overhangs the upper end of the sleeve 16 whereby it may be engaged by the adjusting member 18, when the latter is moved upwardly, as shown in Figure 2. Such upward movement of the member 18 will unset the valve 13 from its seat 12, as will readily be understood by reference to Figure 2. A suitable spring 21 constantly urges the valve 13 into engagement with its seat. Suitable fluid-circulating passages 22 are provided in the wall of the valve casing 6 to permit the pressure fluid entering the valve casing to escape therefrom to the atmosphere.

The threaded sleeve 16 is shown provided at its upper end with a slot 23, whereby it may be conveniently rotated to relatively adjust it with respect to the valve casing 6, by such means as a screw driver or other suitable instrument. Relative vertical movement of the sleeve 16 varies the tension in the spring 21. An aperture 24 is shown provided in the head 19, through which an instrument may also be inserted to relatively rotate the threaded sleeve 16.

The novel valve herein disclosed provides a combination safety and release valve. When the adjusting member 18 is in the position shown in Figure 1, the spring 21 normally holds the valve on its seat to thereby normally interrupt fluid flow through the passage 11. When the pressure in the cooker body reaches a predetermined point, determined by the adjustment of the tension of the spring 21, the valve will unseat to thereby permit the excess steam or pressure to escape from the cooker body through the valve casing 6 and the apertures 22, to the atmosphere.

When the valve is used in connection with a steam pressure cooker such as illustrated in Figure 3, it is often desirable that it be so adjusted that the steam is released very slowly from the cooker body. I have found that when the steam is suddenly or quickly released from the cooker, there is a tendency to draw or extract the juices from the vegetables and other articles of food which may be contained within the cooker body, which of course is objectionable. Such extraction of the juices from the food articles in the cooker may be completely eliminated by the employment of this novel valve, for by its use, the steam may be released very slowly from the cooker body before the cover is released therefrom.

The novel valve herein disclosed is so constructed that by simply rotating the member 18, the valve may be unseated by a micrometer adjustment whereby the discharging of the steam from the cooker body may be controlled at will.

The tension of the spring may also readily be varied by simply loosening the lock screw 17 and relatively rotating the threaded sleeve 16 in its socket, whereby the safety valve may be caused to operate when a predetermined pressure is reached in the cooker body. The device is very simple and inexpensive, and combines in one small, compact unit, a combined safety valve and a fluid release valve, which is neat in appearance and simple to operate.

I claim as my invention:

1. A valve structure comprising a body having a valve seat, a valve operatively associated with the seat and having a stem, a spring for seating the valve, means in threaded engagement with the body and forming a guide for said stem and adjustable for varying the tension on the spring, a member in threaded engagement with the guide, a stop on said stem engageable by the member for gradually unseating the valve, said stop normally concealing the upper end of the guide and having means therein whereby an instrument may be engaged with the guide to relatively adjust it in the body.

2. A valve structure comprising a body having a valve seat, a valve operatively associated with the seat and having a stem, a spring for seating the valve, means in threaded engagement with the body and forming a guide for said stem and adjustable for varying the tension on the spring, means in threaded engagement with the guide and a stop on said stem engageable by said last mentioned means to gradually unseat the valve, said guide having a screw driver slot and said stop having an opening through which an instrument can be passed to engage the slot and adjust the guide to vary the tension on the spring.

CARL NELSON.